United States Patent [19]

Floreancig

[11] Patent Number: 4,758,411
[45] Date of Patent: Jul. 19, 1988

[54] PROCESS FOR THE RECOVERY IN THE FORM OF TETRAVALENT FLUORIDE OF URANIUM EXTRACTED FROM PHOSPHATE-BEARING SOLUTIONS WITH THE ADDITION OF METALIC IONS

[75] Inventor: Antoine Floreancig, Saint Genis Laval, France

[73] Assignee: Uranium Pechiney, Courbevoie, France

[21] Appl. No.: 795,409

[22] Filed: Nov. 6, 1985

[30] Foreign Application Priority Data

Nov. 16, 1984 [FR] France .................................. 84 17994

[51] Int. Cl.$^4$ ............................................. C01G 43/06
[52] U.S. Cl. ......................................... 423/10; 423/259
[58] Field of Search ...................... 423/10, 8, 258, 259; 210/682

[56] References Cited

U.S. PATENT DOCUMENTS

| | | | |
|---|---|---|---|
| 2,830,872 | 4/1958 | McCullough | 423/10 |
| 2,866,680 | 12/1958 | Long | 423/10 X |
| 2,869,979 | 1/1959 | Grinstead | 423/7 |
| 2,873,165 | 2/1959 | Bailes et al. | 423/12 |
| 2,882,123 | 4/1959 | Long | 423/10 |
| 3,004,051 | 10/1961 | Hillyer | 423/9 |
| 3,030,175 | 4/1962 | Magner et al. | 423/10 |
| 4,374,807 | 2/1983 | Ishimi | 423/11 |
| 4,478,804 | 10/1984 | Watanabe et al. | 423/8 X |

OTHER PUBLICATIONS

D. A. Ellis, "The Recovery of Uranium from Industrial Phosphoric Acids by Solvent Extraction", report Dow-81, Contract No. AT-30-1-GEN-236, pp. 47–49 (Jul. 14, 1952).
B. F. Greek, ass't Ed., "Uranium Recovery from Wet Process Phosphoric Acid", *Ind. and Engineering Chem.*, vol. 49, #4, pp. 628–638, Apr. 1957.
Berkman, S. et al., *Emulsions and Foams*, N.Y., Reinhold Pub. Corp., 1941, pp. 285–286.

Primary Examiner—John F. Terapane
Assistant Examiner—Virginia B. Caress
Attorney, Agent, or Firm—Oblon, Fisher, Spivak, McClelland & Maier

[57] ABSTRACT

A process for the recovery of uranium which has been extracted from phosphate-bearing solutions by means of an organic solvent and which is re-extracted from said solvent by means of hydrofluoric acid is disclosed.

The process is characterized in that sodium ions are introduced into the solution of hydrofluoric acid, while aluminum and magnesium ions may also be added to the sodium ions. That solution may be produced by recycling of a fraction of the suspension of fluoride from the re-extraction step, after having separated the solvent, and to which a make-up of sodium, aluminum and magnesium ions and hydrofluoric acid was added.

12 Claims, 1 Drawing Sheet

PROCESS FOR THE RECOVERY IN THE FORM OF TETRAVALENT FLUORIDE OF URANIUM EXTRACTED FROM PHOSPHATE-BEARING SOLUTIONS WITH THE ADDITION OF METALIC IONS

BACKGROUND OF THE INVENTION

1. Field of the Invention:

This invention relates to a process for the recovery in the form of tetravalent fluoride of uranium from an aqueous phosphate-bearing solution.

2. Discussion of the Background:

Phosphate-bearing solutions and in particular phosphoric acid which are produced by sulphuric attack of phosphate-bearing ores contain an amount of uranium which is generally from 0.040 to 0.200 g/l, depending on the origin of the ore.

Because of the high level of interest in uranium in the nuclear industry many processes have been developed for recovering that metal from such solutions.

Some such processes consist of extracting uranium in hexavalent form with organophosphorus solvents such as mixtures of di-2-ethylhexylphosphoric acid and trioctylphosphine oxide. This solvent mixture is commonly referred to as di-2-EHPA+TOPO and described for example in U.S. Pat. No. 3,711,951.

Other processes are based on extracting uranium in the tetravalent form by using other organophosphorus solvents. For example, mixtures of mono and dioctylphenylphosphoric acids are used in a process referred to as the O.P.A.P. process. Alkylpyrophosphoric acids such as octylpyrophosphoric acid are used in a process referred to as the O.P.P.A. process. The O.P.A.P. processes is disclosed in U.S. Pat. No. 3,835,214 and Belgian Pat. No. 870,346. The O.P.P.A. process is disclosed in U.S. Pat. No. 2,866,680.

In the case of processes in which uranium is recovered in tetravalent form, the uranium-charged organophosphorus solvent is generally subjected to a reextraction operation using an aqueous solution of hydrofluoric acid. This causes the uranium in the solution to become a suspension of grains of fluoride which can be recovered from the suspension after separation of the solvent.

Thus, in the case which involves using a solvent such as octylpyrophosphoric acid, the uranium contained in the solvent is re-extracted by a solution of hydrofluoric acid in a proportion of 15% by weight to provide a suspension of $UF_4.2.5H_2O$. However, that fluoride species often occurs in the form of very fine needles which form a thixotropic emulsion with the acid mother liquors and the solvent. The components of this thixotropic emulsion are very difficult to separate by settlement and filtration so that it is frequently necessary to recover the uranium by centrifugation. Centrifuging an emulsion of two liquid phases and a solid phase in a relatively highly concentrated hydrofluoric medium is a problem which is virtually impossible to solve with the equipment available at the present time. And even if centrifugation is possible, there remains in the solvent a substantial amount of fluoride. What is finally recovered is a fluoride which still contains a substantial proportion of mother liquors and which has to be subjected to a drying operation. Those disadvantages detrimentally affect the price of recovered uranium.

There thus remains a strongly felt need for a facile process which will permit the effective recovery of uranium.

SUMMARY OF THE INVENTION

Accordingly, it is an object of the invention to provide a facile process for the recovery of uranium from a phosphate-bearing solution.

It is another object of this invention to provide a process for the recovery of uranium from a phosphate-bearing solution, in which the uranium product is easily separated from the solvent.

It is another object of this invention to provide a process for the recovery of uranium from a phosphate-bearing solution without the use of centrifugation.

The inventors in an effort to remedy the disadvantages of existing process have now surprisingly discovered a novel process in which uranium in the form of fluoride is obtained as larger and denser grains which separate more easily from the solvent and thus which lend themselves to filtration. This process for recovery, in the form of a tetravalent fluoride, of uranium contained in a phosphate-bearing solution, comprises the following stages:

(a) reducing the uranium in the solution to the tetravalent state;

(b) extracting the uranium from the solution with an alkylpyrophosporic acids organic solvent diluted in a hydrocarbon;

(c) re-extracting the uranium from the solvent with an aqueous solution of hydrofluoric acid;

(d) separating the solvent from which the uranium has been removed from the emulsion formed in step (c) and recycling the solvent to the extraction step with a make-up amount of fresh solvent; and (e) recovering the fluoride from the aqueous suspension obtained in step (d).

This process is characterized in that a sodium ion or ions is introduced into the re-extraction solution used in step (c).

The invention is therefore distinguished from the known processes by the presence of a sodium ion and/or Al, Mg ions in the solution of hydrofluoric acid which is used for re-extraction of the uranium.

BRIEF DESCRIPTION OF THE DRAWINGS

A more complete appreciation of the invention and may of its attendant advantages will be readily obtained as the same becomes better understood by reference to the following detailed description when considered in connection with the accompanying FIGURE, wherein the FIGURE shows a basic operating diagram of this invention.

DETAILED DESCRIPTION OF THE PREFERRED EMBODIMENTS

Figure 1:
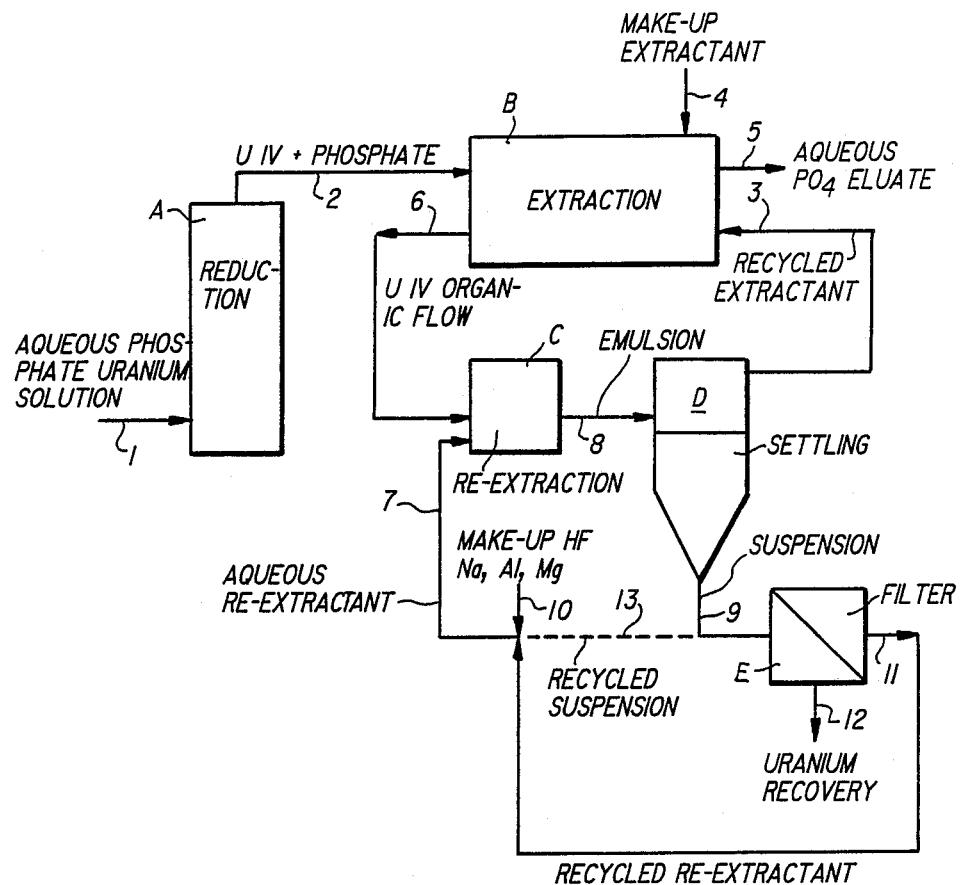

The present process is the result of the discovery by the inventors that a uranium-charged solvent with a sodium ion or ions results in the formation of a suspension of grains of double salt having the formula $UF_4.xNaF$. Unlike the salt $UF_4.2.5H_2O$ which is formed with hydrofluoric acid alone, $UF_4.xNaF$ grains are much denser, non-thixotropic and non-acicular. The recovery of these grains from the solvent is easier. It is possible to recover them easily by filtration without having to use a centrifuging process and the disadvantages thereof.

The sodium ion is introduced into the aqueous solution of acid in the form of compounds of that element such as the hydroxide NaOH or sodium fluoride for example. Two or more sodium ion types may of course be used. The aqueous solution generally derives from the mother liquors which result from the suspension after the fluoride has been recovered and to which fresh hydrofluoric acid is added as a make-up amount to compensate for consumption due to conversion of the uranium contained in the solvent into fluoride.

However, it was found that the introduction of the above mentioned sodium ion into the mother liquors still containing grains of fluoride in suspension made it possible on the one hand to further increase the size of the grains of fluoride and thus to increase the rate of filtration. And on the other hand to reduce to a greater degree the amount of uranium which remains in the solvent since it was possible to attain proportions of less than 0.050 g/l, sometimes down to 0.020 g/l.

It is for that reason that the present invention also includes an alternative process in which the aqueous solution intended for the re-extraction step is a fraction of the suspension which is obtained immediately after separation of the solvent from which uranium has been removed. This fraction is recycled to the re-extraction step after the addition of fresh hydrofluoric acid. And the residual fraction of the suspension is treated to recover the fluoride therefrom and to give mother liquors which are also recycled, at least in part.

In their research work relating to the conditions for the formation of grains of fluoride which are easily separated, the inventors found that a substantial improvement could further be achieved by adding an aluminum and/or magnesium ion to the sodium ion. Indeed, those aluminum and magnesium ions contribute to modifying the crystalline form and the size of the fluoride grains, and thus allow a higher rate of filtration.

The ions may be introduced in the form of the element itself or compounds, either into the mother liquors which are produced from separation of the fluoride, or into the fraction of the suspension to which the necessary make-up amounts of fresh hydrofluoric acid is added. The sodium ion (or ions) is added bearing in mind that in the course of the recycling operation, make-up amounts of aluminum and magnesium ions are necessary.

The make-up amounts are added in such a way as to maintain, in the aqueous re-extraction suspension or solution a concentration of HF which is between 8 and 16% by weight, and preferably between 9 and 13% by weight, and a concentration of sodium of between 0.2 and 20 g/l, and preferably between 0.5 and 5 g/l. It has been found that below a value of 0.2 g/l the addition of sodium was found to be inoperative, while above a value of 20 g/l the level of concentration was too high and harmful to the formation of grains of a suitable form.

When the suspension is recycled, the arrangement is such that it contains between 10 and 300 g/l and preferably between 20 and 150 g/l of solid matter when it comes into contact with the solvent from which uranium is to be removed.

The aluminum and magnesium ions are found to have an optimum effect in the range of concentration of between 0.05 and 5 g/l, with a preference nonetheless for a level of concentration of 0.1 to 1 g/l.

The volume of the re-extraction suspension or solution is not critical: it may be between 0.2 and 5 times the volume of solvent to be treated, but it is preferred to use a range of from 1 to 2.

From a point of view of temperature, although an increase in temperature generally contributes to enhanced separation of the phases, it is desirable to carry out the re-extraction step at between 10° and 30° C. in order to minimise degradation of the solvent by the hydrofluoric acid.

The other steps of the process are carried out in conventional manner, namely:

Before extraction of the uranium, the solution of phosphates resulting from the operation of attacking the ore is subjected to the action of a reducing agent such as iron for example. The purpose of the reducing agent treatment is to adjust the uranium to a valency of 4. This operation uses either iron in powder form which is brought into contact with the solution in an agitated reactor, or plates (for example metal sheets) which are disposed in a column within which the solution is circulated.

The organic solvent used to extract the uranium from the solution is selected from alkylpyrophosphoric acids such as preferably decylpyrophosphoric acid or octylpyrophosphoric acid. Those are the acids which show the best performance when carrying out the present invention and they are used diluted in an aliphatic and/or aromatic hydrocarbon. The aliphatic and aromatic hydrocarbons may be $C_{5-20}$ hydrocarbons.

After uranium has been removed from the solvent by means of the hydrofluoric acid, the solvent is separated from the aqueous suspension and preferably recycled to the extraction step after the introduction of a make-up amount of fresh solvent corresponding to the amount which has been degraded by the acid.

The aqueous suspension which issues from the re-extraction step is subjected to a separation step where the uranium is recovered in solid fluoride form.

The invention will be better understood by now referring to the FIGURE wherein like reference numeral designate identical or corresponding parts throughout. The uranium-bearing and phosphate-bearing solution 1 which results from attacking the ore with sulphuric acid is introduced into the reducing column A which is filled with iron plates to give a solution 2 which is referred to as being "reduced", in which the uranium is in the tetravalent state. That solution is treated in counter-flow mode in an extraction battery B by a flow of recycled organic solvent 3 and a make-up of pure solvent 4 to give a phosphate-bearing solution 5 from which uranium has been removed, and a uranium-charged flow of solvent 6.

The extraction battery B may be a battery of mixer-settling units, a pulsed or agitated extraction column, a battery of centrifugal extractors or a multi-stage centrifugal extractor.

The solvent 6 is passed into the re-extraction battery C which is also fed with a flow at 7 of an aqueous solution of hydrofluoric acid containing sodium ions alone or with the addition of aluminum and/or magnesium ions, in the presence or the absence of a suspension of grains of fluoride.

An emulsion 8 issues from C and is passed into a settling vessel D where separation of the solvent 3 occurs from which uranium has been removed on the one hand and which is recycled to B and on the other hand, the fluoride suspension 9. The suspension 9 is filtered in E to give mother liquors 11 which, after being readjusted to the desired levels of concentration in respect of HF, sodium, aluminum and/or magnesium by means of the make-up 10, are led at 7 to C while the uranium is recovered at 12 in the form of double fluoride.

However, in accordance with the alternative form of the process of the invention, the suspension 9 may be directly recycled to C by way of the circuit 13, while maintaining the make-up at 10.

Other features of the invention will become apparent in the course of the following description of exemplary embodiments which are given for purposes of illustration of the invention and are not intended to be limiting thereof.

EXAMPLE 1

One liter of solvent formed by O.P.P.A. which is 3% diluted in kerosine, and containing 1.1 g/l of uranium is subjected to the re-extraction step using a 12% solution of HF, containing 5 g/l of sodium ions. There are collected a solvent from which uranium has been removed and which contains 0.200 g/l of uranium and a suspension of $UF_4 \cdot xNaF$ which is recycled to the re-extraction operation with a make-up of HF at a value of 70% by weight, and sodium hydroxide at a value of 30% by weight. After three cycles, it is found that the grains, which were initially very fine, become increasingly dense and separated more rapidly from the organic and aqueous phases.

At the end of the eighth cycle, the uranium content of the solvent has been reduced to 0.040 g/l while the suspension contained 21 g/l of solid. The latter was filtered over a Buchner funnel and under a pressure difference of 0.05 MPa, at a rate of 1.1 m$^3$/m$^2$h.

The same test was carried out without sodium ions. After eight cycles, the solvent still contained 0.080 g/l of uranium and the suspension collected, which was charged with 19.8 g of solid, underwent filtration only at a rate of 0.09 m$^3$/m$^2$h.

Examination of the products obtained in the two cases under a microscope showed that the majority of grains were of a size of between 5 and 10 μm in the test in the presence of sodium ions while 0.2 μm without sodium ions.

EXAMPLE 2

This Example relates to the simultaneous addition of sodium, aluminum and magnesium ions. The solvent of Example 1 with an identical charge of uranium was treated under the same conditions but using a re-extraction solution with 12% of HF, containing 1 g/l of Na, 0.1 g/l of Al and 0.1 g/l of Mg.

At the end of the second cycle, very dense grains are obtained, with a mean size of from 10 to 20 μm and which separate very easily from the aqueous phase. A filtration test carried out after the eighth cycle gave a filtration rate of 1.8 m$^3$/m$^2$h. The uranium content of the solvent was now only 0.050 g/l whereas it was 0.210 g/l after the first cycle.

EXAMPLE 3

In this Example, reference is made to the accompanying drawing. The phosphoric acid 1 having been reduced in the column A has given a solution 2 of the following composition (in % by weight).

| | |
|---|---|
| $P_2O_5$ | 27.0 |
| $SO_4$ | 1.6 |
| F | 0.9 |
| Ca | 0.4 |
| $Fe^{2+}$ | 0.47 |

| -continued | |
|---|---|
| $Fe^{3+}$ | 0.12 |
| U | 0.083 (i.e. 0.108 g/l) |

That solution was subjected to the extraction operation in a counter-flow mode in a battery of two mixing-settling units B using a flow 3 of a solvent formed by 3% of octylpyrophosphoric acid diluted in kerosine, coming from the re-extraction settling at D. The flow rates were 300 l/h for the acid and 20 l/h for the recycled solvent.

A flow of 0.33 l/h of fresh solvent containing 500 g of O.P.P.A. per liter of kerosine is introduced at 4, to compensate for losses due to degradation.

The solution of phosphoric acid from which uranium has been removed, as indicated at 5, now contained only 0.005 g/l of uranium.

The charged solvent 6 containing 1.55 g/l of uranium was treated in C using a flow of 35 l/h of a suspension 7 formed by hydrofluoric acid in a proportion of 12% by weight, with 1 g/l of sodium ions and 100 g/l of solid material.

The emulsion 8 issuing from C was passed into the settling unit D to give a solvent 3 which now only contained 0.045 g/l of uranium and which was recycled to B and a suspension 9 which was passed directly into C by way of the circuit 13 after restoration of its concentration in respect of HF and Na by the addition at 10 of 70% HF and 30% NaOH.

A fraction of the suspension 9 was filtered and washed in E to give mother liquors 11 which were recycled to C and uranium recovered in the form of fluoride at 12. The rate of filtration of that suspension was 1.4 m$^3$/m$^2$.h, under a pressure differential of 0.05 MPa.

Microscopic examination of the grains produced revealed that they were of a mean size of 16 μm and their elementary analysis after washing gave the following figures:

| | U | F | Na | Al | Mg | Th | Yb | P | Fe |
|---|---|---|---|---|---|---|---|---|---|
| % by weight | 43.6 | 28.9 | 5.15 | 0.6 | 0.6 | 5.3 | 0.4 | <0.1 | <0.12 |

This invention is used in particular in the recovery of uranium which is contained in phosphoric acid when the uranium is to be obtained, with a good re-extraction yield, in the form of a fluoride, permitting a high rate of filtration which is sufficient in all situations to avoid having recourse to centrifuging methods.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for the recovery of uranium contained in a phosphate-bearing solution, said process comprising:
   (a) reducing the uranium contained in the said phosphate-bearing solution to the tetravalent state;
   (b) extracting the said tetravalent uranium from the phosphate-bearing solution into an organic solvent comprising an alkylpyrophosphoric acid and a hydrocarbon;

(c) re-extracting the tetravalent uranium extracted into the said organic solvent into an aqueous solution of hydrofluoric acid by contacting the organic solvent containing the tetravalent uranium with an aqueous solution of hydrofluoric acid to form an emulsion;

(d) separating the said organic solvent, from which uranium has been removed, from the emulsion formed in step (c) to obtain an aqueous suspension, and recycling the said organic solvent to extraction step (b) together with a make-up amount of fresh organic solvent; and (e) recovering uranium tetrafluoride from the aqueous suspension produced in step (d);

wherein a sodium ion is introduced into the re-extraction solution used in step (c) in a concentration of between 0.2 and 20 g $l^{-1}$.

2. The process of claim 1 comprising using as the said sodium ion sodium hydroxide or sodium fluoride or a mixture thereof.

3. The process of claim 1, comprising using as a re-extraction solution a solution obtained from recycling at least a fraction of the suspension obtained in step (d), to which a make-up amount of hydrofluoric acid and sodium ion is added.

4. The process of claim 1, comprising adding at least one metallic ion of aluminum or magnesium or a mixture thereof to the said sodium ion.

5. The process of claim 4, comprising using a re-extraction solution obtained from the recycling of at least a fraction of the suspension obtained in step (d), to which there is added a make-up amount of hydrofluoric acid, of the said sodium ion and of the said ion of aluminum or magnesium.

6. The process of claim 1, comprising using a concentration of sodium ion in the re-extraction solution of between 0.5 and 5 g/l.

7. The process of claim 4, comprising using a concentration of a metallic ion, apart from sodium ions, in the re-extraction solution of between 0.05 and 5 g/l.

8. The process of claim 7, comprising using a total concentration of metallic ion, apart from sodium ions, of between 0.1 and 1 g/l.

9. The process of claim 1, comprising using a concentration of hydrofluoric acid in the re-extraction solution of between 8 and 16% by weight.

10. The process of one of claims 4 or 5, comprising using a re-extraction suspension containing between 10 and 300 g/l of solids.

11. The process of claim 1, comprising using a suspension of hydrofluoric acid containing between 20 and 150 g/l of solids.

12. The process of claim 1, comprising carrying out the uranium re-extraction step at a temperature of between 10° and 30°.

* * * * *